United States Patent [19]

Leingang

[11] 4,338,783

[45] Jul. 13, 1982

[54] TWO-STAGE HYPERSONIC RAMJET

[75] Inventor: John L. Leingang, Dayton, Ohio

[73] Assignee: The United States of America as represented by the Secretary of the Air Force, Washington, D.C.

[21] Appl. No.: 610,513

[22] Filed: Sep. 4, 1975

[51] Int. Cl.³ .......................... F02K 7/18; F02K 9/76
[52] U.S. Cl. .................................... 60/225; 60/270 R
[58] Field of Search ................ 60/225, 240, 244, 266, 60/261, 270 R; 137/15.2

[56] References Cited

U.S. PATENT DOCUMENTS

| | | | |
|---|---|---|---|
| 2,540,594 | 2/1951 | Price | 60/240 |
| 2,570,629 | 10/1953 | Anxionnaz et al. | 239/265.33 |
| 2,644,396 | 7/1953 | Billman | 60/225 |
| 2,684,629 | 7/1954 | Nordfors | 60/244 |
| 2,686,473 | 8/1954 | Vogel | 60/244 |
| 2,766,581 | 10/1956 | Welsh | 60/261 |
| 2,995,892 | 8/1961 | Kosson et al. | 137/15.2 |
| 3,066,480 | 12/1962 | Buck | 60/266 |
| 3,067,573 | 12/1962 | Connors | 138/46 |

Primary Examiner—Stephen C. Bentley
Attorney, Agent, or Firm—Donald J. Singer; Arthur R. Parker

[57] ABSTRACT

A two-stage ramjet engine including an aft end, ejectable, boost stage-combustor/nozzle assembly for initially accelerating from low-to-mid-supersonic launching speeds to high supersonic speeds, and mounted in a tandem arrangement immediately aft of a separate, forward end-cruise stage-combustor/nozzle assembly positioned directly behind an inlet-diffuser section for subsequently further accelerating from high supersonic to hypersonic speeds after ejecting the entire boost stage.

1 Claim, 9 Drawing Figures

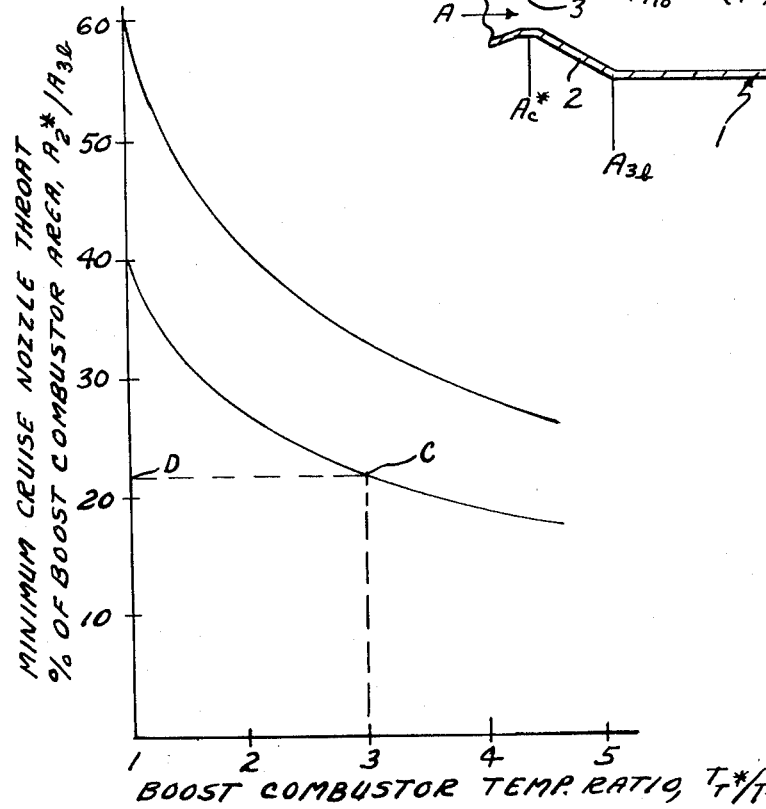
Fig-1
Fig-1a
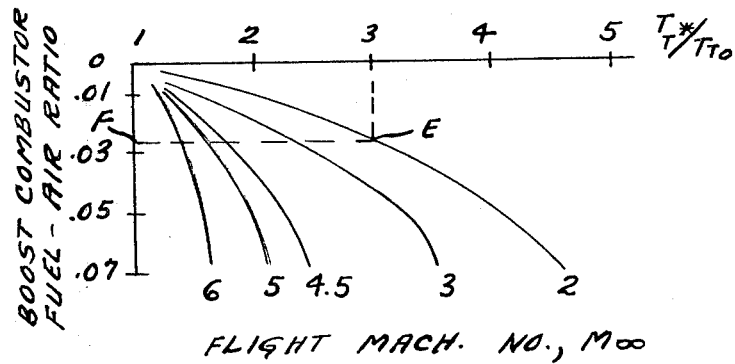
Fig-1b

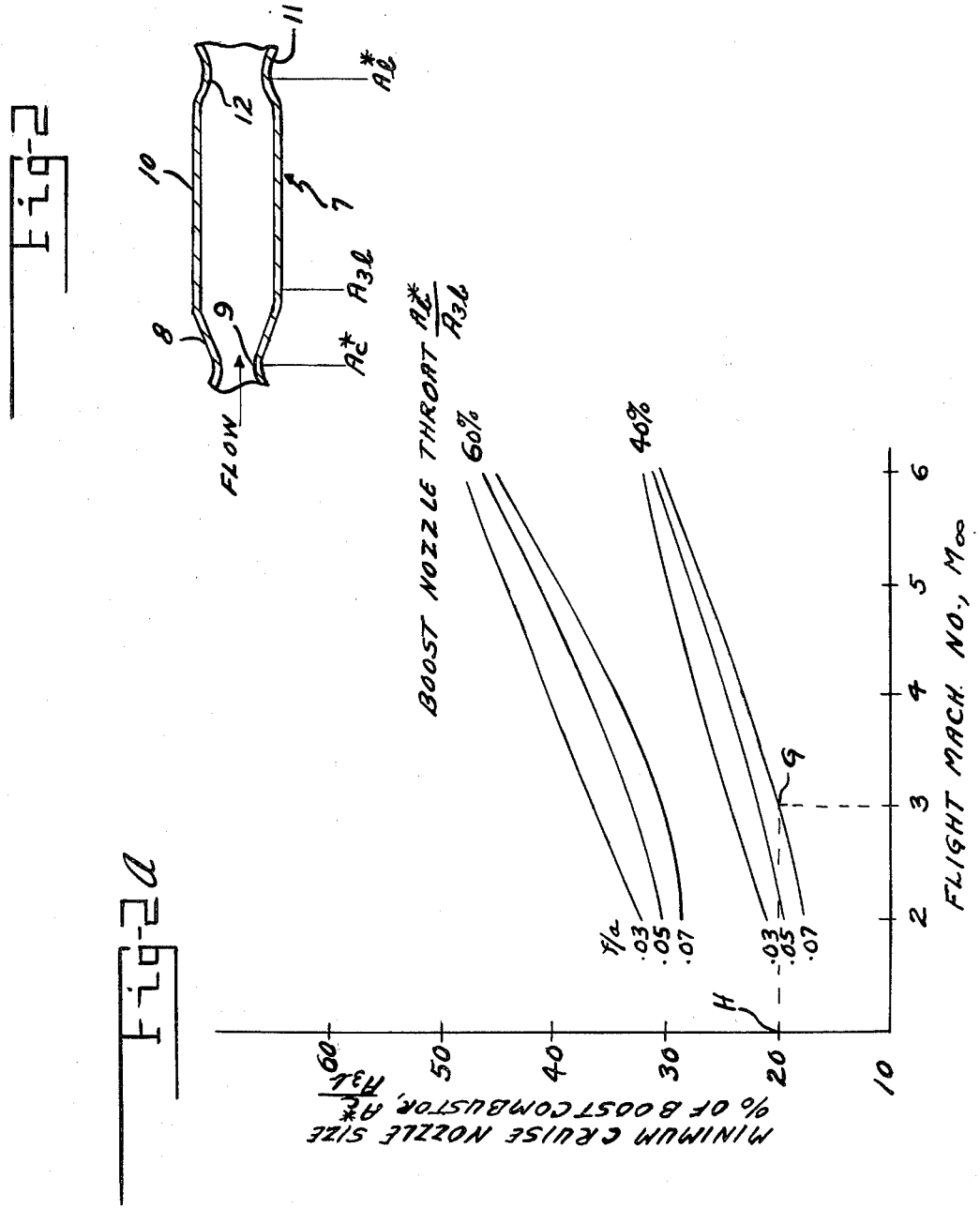

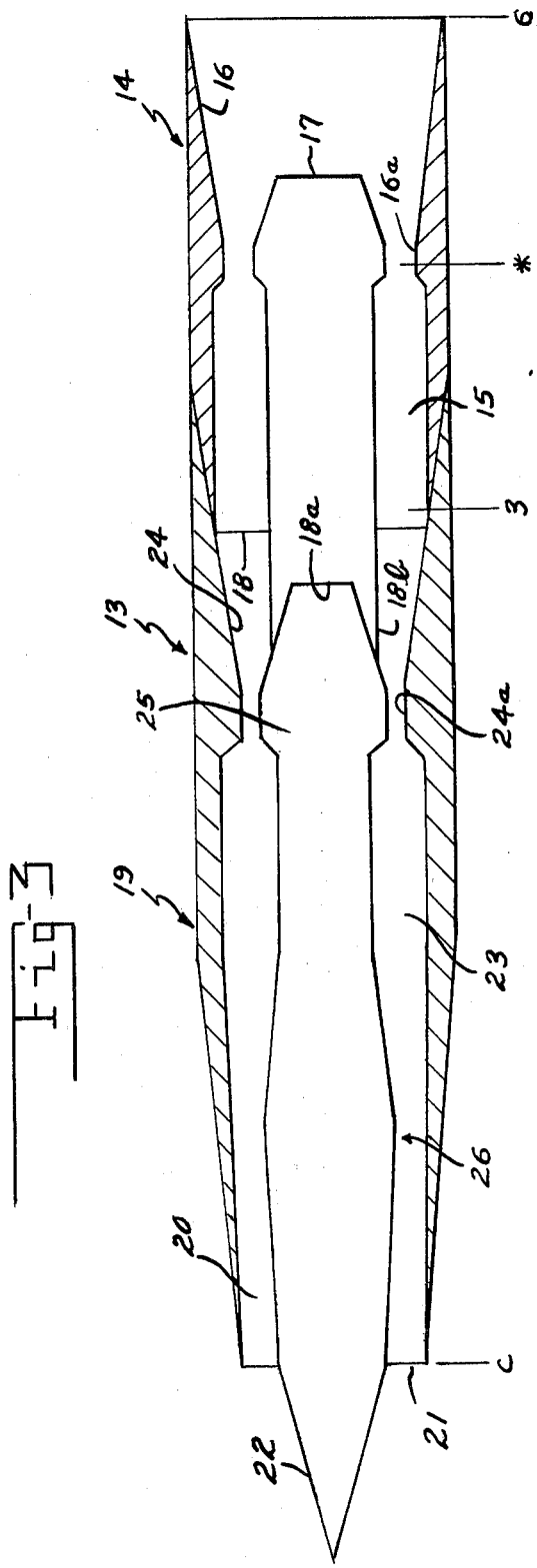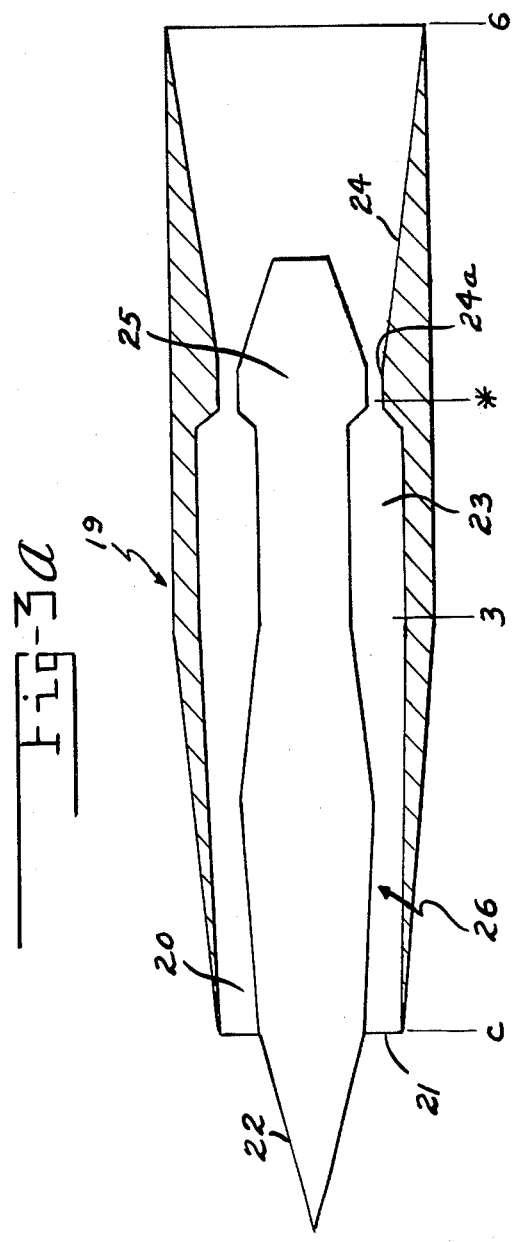

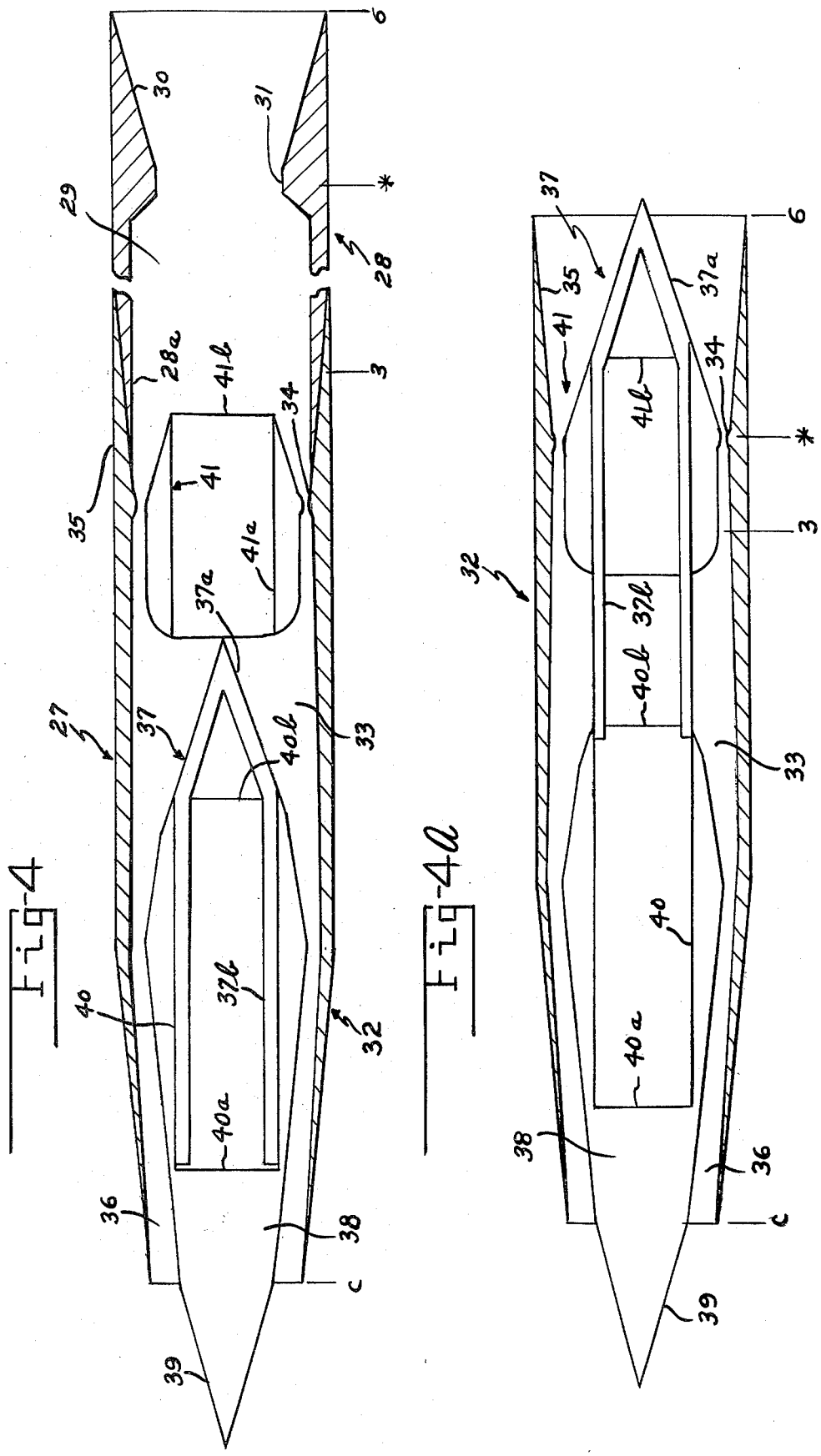

TWO-STAGE HYPERSONIC RAMJET

RIGHTS OF THE GOVERNMENT

The invention described herein may be manufactured and used by or for the Government of the United States for all governmental purposes without the payment of any royalty.

BACKGROUND OF THE INVENTION

The present invention relates generally to the ramjet engine and, in particular, to an improved fixed geometry-type ramjet engine that is compatible to both supersonic and hypersonic flight.

The ramjet is the simplest of all air-breathing propulsion engines used to produce supersonic and/or hypersonic flight within the earth's atmosphere. Although it is self-evident that the fixed geometry ramjet engine offers the most efficient operation at a particular and relatively narrow flight regime, since, obviously, the specific engine design and, in particular, its combustor and exhaust nozzle can be tailor-made to a selected operating speed regime, it is a conventional practice to utilize a single combustion chamber with a variable, two-position exhaust nozzle whereby the size and to a certain extent the configuration of the nozzle and the area of the throat may be altered to one of two different settings to thus produce a wider operating speed range, or, in other words, make the same ramjet engine capable of operating at both supersonic and hypersonic speeds merely by changing the position of the nozzle to vary the area of the throat.

Initially, of course, the ramjet engine and vehicle in which housed would be required to be boosted or accelerated preferably to at least a low supersonic speed needed for its relatively efficient operation. This boost could be provided in the case of a ramjet-powered missile, for example, which is perhaps the most desirable use of the ramjet, either by the ground-or air-launch thereof. During such launching operation, the exhaust nozzle of the conventional, variable geometry ramjet would have been adjusted to its first position of adjustment compatible with a predesigned supersonic speed range. Upon completion of the aforesaid launching operation, combustion would then be initiated in the single combustion chamber with the said variable geometry exhaust nozzle having been already adjusted to the aforementioned first position of adjustment. This action would naturally accelerate the previously launched ramjet-powered missile, for example, to a relatively high supersonic speed. At this time, the exhaust nozzle would then be changed to its second position of adjustment to even further accelerate the missile into the hypersonic speed regime.

Although the two-position nozzle offers an opportunity to extend the inherent capability of the ramjet to operate in a much wider flight speed range, it also suffers from the obvious disadvantage of requiring a rather complex mechanical arrangement to adjust the position of the nozzle from one flight regime to the other and which may also add undesirable weight to the system. It is, therefore, clearly very desirable, if not absolutely essential, to produce a ramjet engine that both inherently combines the superior performance level of a wide speed range, supersonic/hypersonic ramjet that is available with the previously-referred to two-position exhaust nozzle, with the relative simplicity and efficiency of a fixed geometry ramjet engine. In this connection the new and improved ramjet of the present invention proposes the solution to the above-outlined problem by mounting two separate, fixed geometry stages; namely, a boost stage and a cruise stage in tandem with the boost stage being ejected after performing the requisite acceleration to the speed at which combustion of the cruise stage would be initiated. In this connection, it is to be noted that the broad concept of the use of an ejectable element is already known, for example, with specific regard to an "afterburner-booster", described in a Marquardt Aircraft Co. report, entitled "Study of Self-Acceleration Potentialities of Ramjet Engines", dated May 22, 1951, in which there was utilized an "open tailpipe as an ejectable afterburner"; however, the design of that arrangement was limited to acceleration from subsonic speeds to low supersonic speeds. On the other hand, as will be noted hereinafter in the following summary and detailed description, the present invention is specifically designed to significantly increase the efficiency of the ramjet engine over a much wider speed range from low supersonic to hypersonic with the use of two, separate and principal, thrust-producing stages arranged in tandem and which are obviously quite different from the above-referred to previously-proposed "ejectable afterburner". In this regard, a U.S. Pat. No. 3,040,517, issued on June 26, 1962 to C. V. Ryden et al involved a "Releasable Rocket Nozzle" in which a booster nozzle is made releasable from a ramjet vehicle. In particular, the Ryden arrangement consists of a ramjet vehicle having both a ramjet motor and a rocket booster motor mounted in tandem relative to each other and respectively exhausting through their own individual exhaust nozzle. When the boost operation of the Ryden ramjet vehicle is completed, the exhaust nozzle for the boost operation is then released and thus the obvious and well-known relative inefficiencies of a single nozzle for both the booster and ramjet used in previously-developed designs involving the combination of ramjet and rocket motors is thus eliminated. However, the two-stage ramjet arrangement of the present invention constitutes an advantageous technique by involving the use of completely separate combustor-nozzle assemblies that ensures the utilization of the most optimum combustion chamber design, as well as the exhaust nozzle design, for each of two speed ranges to thus produce a still further improvement in the field of ramjets, as will become readily apparent hereinafter in the following disclosure.

SUMMARY OF THE INVENTION

This invention consists in a two-stage, ramjet engine employing two separate and distinct combustor-nozzle assemblies mounted in tandem behind a conventional ramjet inlet-subsonic diffuser and respectively representing separate flight regimes collectively and consecutively varying from supersonic to hypersonic. One of the said combustor-nozzle assemblies, which is to be used at the higher end of the design speed ranges; namely, the hypersonic flight regime, is termed the cruise stage-combustor-nozzle assembly, and it is incorporated in a conventional manner immediately behind the engine inlet-diffuser assembly, whereas, the other combustor-nozzle assembly to be used at the lower (supersonic) end of the overall flight speed range is referred to as the accelerative or boost stage-combustor-nozzle assembly, and it is releasably mountable in tandem directly to and behind the first-named cruise stage-combustor-nozzle assembly on the extreme aft end of the engine.

At the start of ramjet operation, which could be effected after a guided missile, for example, containing the present ramjet engine had been boosted to a flight speed from low-to-mid-supersonic as by means of either the ground-or air-launch thereof, combustion of fuel would be initiated and sustained in the separate combustion chamber of the aft end-mounted, accelerative or boost stage-combustor-nozzle assembly, which assembly may, or course, be specifically sized, in a well-known manner to produce the necessary boost operation from, in this case, the low-to-mid-supersonic launch speed to relatively high supersonic speed. In this connection, it is noted that the engine air flow would have naturally entered the now-launched ramjet engine through its forward-mounted, inlet-diffuser from whence it would then proceed downstream initially through the cruise stage-combustor-nozzle assembly for its subsequent entry into the boost stage-combustor-nozzle assembly where it would be mixed and ignited in the combustion chamber thereof. Thereafter, the combustible products thereof would enter and be exhausted from its exhaust nozzle to produce the desired initial acceleration or boost operation of the ramjet to a relatively high supersonic speed. In this regard, it is to be noted that the cruise stage-nozzle throat is made specifically smaller than that of the boost stage-nozzle throat to thereby achieve, for example, a nozzle throat size that is most compatible with hypersonic flight. Its actual size would be governed by well-known gas dynamic criteria applicable to the design of aerodynamic grids currently used in conventional ramjets and actually forming no specific part of the present invention.

The aforementioned flow of air through the cruise stage-nozzle throat during the boost or accelerative operation of the instant ramjet would behave in every respect, as though it were flowing through a conventional aerodynamic grid. To initiate the cruise stage or mode of operation, the entire boost or accelerative stage-combustor-nozzle assembly of the instant invention would then be mechanically ejected from its aft location by any well-known and already available, conventional means, and fuel injection and combustion then initiated in the now separated, cruise stage-combustor. It is noted that the cruise stage-nozzle throat, which is naturally made smaller than that of the boost or accelerative stage-nozzle throat, as noted before, restores the inlet to a critical pressure recovery, increasing the engine efficiency in the same manner as with a conventional variable nozzle. Because of the use of the ejectable or, in other words, the "throw-away" boost or accelerative stage-combustor-nozzle assembly, the present ramjet engine is obviously best suited to a one-time missile use.

Other inherent objects and advantages of this invention will become self-evident hereinafter in connection with the following disclosure, taken with the accompanying drawings; in which:

BRIEF DESCRIPTION OF THE DRAWINGS

FIG. 1 is a schematic, side and longitudinal section view of a very basic form of the new and improved two-stage ramjet of the present invention;

FIGS. 1a and 1b depict graphs used in connection with basic form of the invention of FIG. 1 and illustrating the minimum cruise nozzle throat size permitted for the inventive ramjet as a function of the boost nozzle size and certain boost chamber conditions;

FIG. 2 is a second schematic, side and longitudinal section view, showing a somewhat modified form of the two-stage ramjet of FIG. 1 incorporating a longer combustion chamber;

FIG. 2a is another graph of the variation in the boost and cruise nozzle sizes particularly applicable to the inventive form of FIG. 2 and presented more directly in terms of the flight Mach no.;

FIGS. 3 and 3a are schematic, side and partly longitudinal section views of a more complete, plug-nozzle form of the novel two-stage ramjet of the present invention and respectively illustrating the condition of the engine before and after the ejection of the boost stage thereof; and FIGS. 4 and 4a are additional schematic, side and partly longitudinal section views, as in FIGS. 3 and 3a, of a modified form of the inventive two-stage ramjet in which the plug elements thereof have been omitted and a unique cold-flow valve substituted therefor for controlling the cruise nozzle throat size.

DESCRIPTION OF THE PREFERRED EMBODIMENT

Referring generally to the drawings and, in particular, to FIG. 1 thereof, a basic form of the two-stage ramjet of the present invention is indicated generally at 1 as including a cruise stage-nozzle and throat at 2 and 3 through which is flowing the incoming air at A, a boost stage-combustor 4, and a boost stage-nozzle and throat at 5 and 6. The exhaust flow is denoted at the arrow B. The cruise combustor and inlet-diffuser, to be described hereinafter in specific connection with FIG. 3, for example, have been omitted from the views of FIGS. 1 and 2 for the sake of clarity. The areas of the cruise nozzle throat 3, the boost combustor 4 and the boost nozzle throat 6 have been respectively denoted by the symbols $A_c^*$, $A_{3b}$ and $A_b^*$.

With particular reference to the graph of FIG. 1a, it is seen that, for the two-stage ramjet configuration of FIG. 1, for example, the minimum cruise nozzle throat size has been plotted on the ordinate against the variation in the boost combustor temperature ratio, $T_t^*/T_o$, on the abscissa for two separate curves, marked 40% and 60% and representing the ratio of the area of the boost combustor nozzle 5 as a percentage of the area of the boost chamber or combustor 4 or, in other words, $A_b^*/A_{3b}$. All of the above factors are, of course, well-known in the ramjet engine technology. Thus, if the particular design of the inventive ramjet engine 1 would have a boost combustor temperature ratio, $T_t^*/T_{to}$, value of 3, for example, and a boost chamber nozzle area equal to 40% of the boost chamber area, which value of 3 on the abscissa of the graph marked 40% in FIG. 1a is indicated at C, then a minimum cruise nozzle throat value of 22 in % of the boost combustor area could be easily selected on the ordinate of the aforementioned 40% graph portion of FIG. 1a, as indicated at D. Moreover, by selecting the same $T_t^*/T_{to}$ ratio value of 3 on the abscissa of the graph of FIG. 1b, for a flight Mach No. of 2, for example, represented at E on one of a series of curves depicted in the aforementioned FIG. 1b, a boost combustor fuel-air ratio value of 0.026 can be selected at F on the ordinate of the same graph.

If it is desired to determine the specific boost and cruise nozzle size relation more directly in terms of the flight Mach No., the graph of FIG. 2a may be utilized.

The said FIG. 2a graph may be integrated with the two-stage ramjet, indicated generally at 7 in FIG. 2 as being of a somewhat modified configuration than that of FIG. 1 and which again includes a cruise nozzle 8, a cruise nozzle throat 9, a boost combustor 10, a boost nozzle 11 and boost nozzle throat 12. In the aforementioned FIG. 2a graph, the minimum size (area), $A_c^*$, for the cruise nozzle throat 9 (Note FIG. 2) is plotted on the ordinate for variations in the flight Mach No. plotted on the abscissa for a series of different fuel-air ratios plotted for each of the previously-noted 40% and 60% values representing two boost nozzle throats. Thus, once more, if the minimum cruise nozzle size in % of the boost combustor size, of $A_c^*/A_{3b}$, were desired for a flight Mach No. of 3 and a fuel-air ratio of, for example, 0.07, denoted at G on the 40% curve (FIG. 2a), a value equal to 20% could be easily selected on the ordinate at H for the said minimum cruise nozzle size in terms of the percent of the area, $A_{3b}$, of the boost combustor 10.

By the use of the above-outlined graphs of FIGS. 1a and 2a or other precomputed graphs similar thereto, the particular relationships between the sizes of the cruise nozzle and boost nozzle throats of the more complete depiction of the two-stage ramjets of the present invention, to be described hereinafter in specific connection with FIGS. 3 and 4, may likewise be selected therefrom. Referring now to FIGS. 3 and 3a, the new and improved two-stage ramjet of the present invention is denoted more completely at 13 as comprising a first, aft-mounted, boost stage, indicated generally at 14 as including a boost stage-combustion chamber 15, an exhaust nozzle 16 and a first plug element at 17 that actually makes the nozzle 16 a plug nozzle, which plug element 17 extends upstream to a position projecting further forwardly of the inlet 18 of the said boost stage 14. In addition, the first plug element 17 may be preferably designed with a recess or cut-out portion 18a on and within its upstream or forward end 18b for a specific purpose to appear obvious hereinafter.

In addition to the above-described first, boost stage 14, the unique two-stage ramjet engine 13 also includes a second, forward-mounted, cruise stage, indicated generally at 19, which cruise stage 19 may be mounted immediately to the rear of, and, if desired, made integral with the inlet-diffuser 20 and through the air inlet 21 of which may extend the spike element 22. Said second cruise stage 19 may also incorporate a cruise stage-combustion chamber 23, an exhaust nozzle 24 that overlaps and is normally arranged in a sealed and releasable relation to the outer circumference of the inlet 18 of the boost stage-combustion chamber 15 as shown, and, as in the case of the latter stage 14, a second plug element at 25 that projects in an aft direction and exactly interfits in a complementary and sealed relation within the recess 18a inherently formed in the upstream or forward end portion 18b of the first-named, boost stage-plug element 17. In this manner, a continuous air passage extends between air inlet 21 and the boost nozzle 16.

The aforementioned cruise stage-plug element 25, which also makes the cruise-nozzle 24 a plug nozzle, may actually constitute the downstream end portion of a combined center body and plug element means 26 to the opposite, forward and aft ends of which may be integrally formed the previously-mentioned spike element 22 and cruise stage-plug element 25. Thus, as described above in accordance with the unique teachings of the present invention, a ramjet has now been proposed that has two separate combustor-nozzle assemblies representing the boost and cruise stages 14 and 19 of ramjet operation and uniquely mounted in tandem behind a conventional ramjet inlet-subsonic diffuser as at 20. Naturally, with this unique tandem arrangement, each of the said boost and cruise-stages 14, 19 can be easily optimized for the specific portion of the speed range over which it is to operate, as for example, by appropriately sizing the cruise nozzle throat, as at 24a with relation to the boost nozzle throat, as at 16a, for example, in accordance with, and by use of the previously-discussed sizing criteria graphs of FIGS. 1a and 2a, or by the use of other graphs similar thereto. Therefore, for a Mach 2 to 6 ramjet, for example, the entire boost stage assembly 14 including both boost-combustion chamber 15 and nozzle 16 would be optimized for a Mach 2 to 4 acceleration and additionally the entire cruise stage assembly 19 to include both combustion chamber 23 and nozzle 24 would be optimized for a Mach 4 to 6 cruise. This separate and complete optimization for the two different portions of the overall speed range at which the ramjet engine 13 of the present invention is designed to be utilized by the use of distinct combustor/nozzle assemblies for each portion constitutes the crux of the improvement of the present invention over other previously-developed ramjets, since the combustor flame stabilization, the fuel injection and structural problems inherent in the supersonic acceleration and the hypersonic cruise speed regimes are vastly different. With the present ramjet engine concept, therefore, a novel means has been provided for operations over the entire flight regime of, for example, the previously-noted Mach 2 to 6 without the necessity of attempting to develop a single combustor structure and gas dynamic design for handling the entire speed range.

To initiate operation of the subject ramjet engine 13 in the lower speed acceleration mode (low to mid-supersonic) after, of course, it having been either ground- or air-launched in a guided missile, for example, fuel injection and combustion by any well-known conventional means (not shown) may be easily effected in the aft, boost stage-acceleration combustor chamber 15. The engine air flow after naturally entering through the air inlet 21, and passing through the forward mounted, inlet-diffuser 20, would continue its rearward flow through the cruise combustion chamber 23, and cruise nozzle throat 24a and cruise exhaust nozzle 24, this being at the freestream recovery temperature ($T_{to}$). Said cruise nozzle 24 is specifically sized, in known manner, so that during the acceleration mode, the Mach number at its throat 24a will not exceed unity at the most restrictive flight condition. Thereafter, the engine air flow exits the said cruise nozzle 24 and enters the inlet to the combustion chamber 15 of the boost stage 14, whereupon the aforementioned fuel injection and combustion occurs to cause the ejection or exhausting of the combustible products thereof rearwardly from the boost nozzle 16 to thereby create the boost or accelerative operation of the inventive ramjet engine 13 from the previously-referred to low-to-mid-supersonic speed of launch to a relatively high supersonic speed, or, in other words, to vary the ramjet engine-carrying missile from between the previously-described first speed range portion of Mach 2 to 4 incorporated within the overall speed capability of Mach 2 to 6 of the present engine.

The foregoing optimization of both the boost and cruise stages 14 and 19 to respectively provide flight regimes in the two ranges of Mach 2 to 4 and Mach 4 to 6 may be reasonably effected in the FIG. 3 form of the invention by making the ramjet engine 13 thereof with an overall area ratio of the inlet 21 to the outlet, $A_c/A_6$, (Note the points c and 6 in FIG. 3, for example) of 0.5, a ratio of the inlet area to the boost chamber area, $A_c/A_3$, of 1.0 and the ratio of the area of boost nozzle throat 16a to the area of the boost chamber 15, $A^*/A_3$, equal to 0.68. In addition, the ramjet engine 13 would have an overall length of 100 inches, and a cowl diameter of 12 inches. Of course, as was previously-described, the plug nozzles 16 and 24 are used with combustion chambers 15 and 23 which are made of an annular configuration. In the boost stage 14, the dimensions to be used would be made adequate enough to permit at least a 1.25 inch thickness of ablator/insulator in the combustor 15 and at least 1.75 inches in the nozzle throat 16a. In the cruise stage-combustion chamber 23, up to 1.50 inches of a similar material may be used, if desired, and 2.75 inches thickness in the cruise throat 24a is possible. After reaching the aforementioned Mach 4 through the operation of the boost stage 14, the latter stage 14, which would be removably interconnected with the forward-mounted, cruise stage 19, would be ejected therefrom by any well-known means, such as by the use of electrically operated, explosive squibs. Said releasable interconnecting means are not further shown, since the specific details thereof are unimportant to the present invention. Upon the ejection of the entire aft-mounted, boost stage 14 including its combustor 15 and nozzle 16, fuel injection is then initiated in a conventional manner in the forward-mounted, cruise stage-combustion chamber 23, and the previously-instituted acceleration continues to the specified amount, which, in this instance, would be from the previously-attained Mach 4 produced by boost stage 14 up to the desired hypersonic cruise speed of Mach 6, if desired. To ensure that the entire assembly of the cruise stage 19 is correctly optimized for ensuring that it produces the correct second speed range portion of Mach 4 to 6, which, of course, includes the assurance of staging at the Mach 4 speed, it, like the boost stage 14, also incorporates the same area ratios of $A_c/A_3$ (Note FIG. 3a) equal to 1.0 and $A_c/A_6$ equal to 0.5. However, the ratio between the area of its cruise throat 24a, at the point *, and the area of the cruise combustor 23, at the point 3, is made equal to 0.385, which ratio values have been previously determined from known computational means to ensure or substantially ensure the above-described overall engine performance of the inventive ramjet 13.

The foregoing ramjet engine 13 could be modified, if desired, so as to specifically size the boost and cruise nozzles to provide for staging at Mach 4.5 instead of the Mach 4 of the FIG. 3 arrangement, in order to determine whether an improved specific impulse might result at Mach 6. From computational analysis of this modification and with the use of appropriate graphs as in FIGS. 1b and 2b, a small gain in specific impulse of 40 seconds at Mach 6 resulted. With the said modified engine, the boost combustor thereof could be equipped with an ablator/insulator thickness of up to 1.25 inches and similarly the boost nozzle throat could be lined with up to 3.4 inches of ablator/insulator material. On the other hand, thicknesses of 1.5 inches and 2.85 inches would be respectively permissible in the cruise combustor and nozzle throat.

With specific reference to FIGS. 4 and 4a of the drawings, a somewhat modified form of the two-stage ramjet of the invention is indicated generally at 27 as again including an aft, ejectable or separable boost stage 28 comprising a boost-combustion chamber 29, exhaust nozzle 30 and throat 31, and a separate forward, cruise stage 32, again, having its own individual cruise combustion chamber 33, cruise exhaust nozzle-throat 34 and cruise exhaust nozzle, indicated at 35 as overlapping the outer circumference of the inlet 28a of the said boost stage 28. Just as is the case with the inventive form of FIG. 3, it is the overlapping portions of the cruise-exhaust nozzle 35 and boost-inlet 28a which are releasably interconnected in a sealed relation with each other and which may be automatically separated from each other for the ejection of the boost stage 28 therefrom by any well-known quick-release means, such as a remotely-operated explosive squib means, which means are not further shown herein since the details thereof are unimportant to the present invention, as noted hereinbefore.

As with the FIG. 3 inventive form, operation of the two-stage ramjet 27 of the aforementioned FIGS. 4 and 4a would be initiated, after, of course, its ground- or air-launch to an initial speed of from low-to mid-supersonic, by the start of combustion in the combustion chamber 29 of the accelerative or boost stage 28. The said combustion would result, of course, from the injection and ignition of fuel, again by well-known and already-available fuel injection and ignition means (not shown), with air entering through the forward mounted inlet-diffuser at 36 (FIGS. 4 and 4a) and passing into and out of the cruise-combustion chamber 33 and exhaust nozzle 35 into the boost-combustion chamber 29 where the aforementioned fuel injection and ignition would occur to thereby form products of combustion that are then naturally then exhausted rearwardly out of the boost nozzle 30 to produce the necessary thrust for effecting an acceleration up to a relatively high supersonic speed, or, in other words, in the present case, from the previously-referred to Mach 2 to 4 speed range.

After achieving the design Mach 4, mentioned above, the boost stage 28 would be ejected in known manner and, simultaneously therewith, actuation of the cruise stage 32 would occur, again, by the initiation of fuel injection and combustion in the cruise-combustion chamber 33. At this point, it is noted that the modified feature of the inventive form of FIGS. 4 and 4a comes into operation. This modification consists in eliminating the plug elements 17 and 25, depicted in FIGS. 3 and 3a, and, in their place, utilizing a cold-flow valve member 37 of a preferably hollow form in the inlet of the cruise stage 32. For this express purpose, the center body element, at 38, to the forward end portion of which may be integrally formed the conventional-type of spike element 39 that is shown projecting outwardly of and further upstream from the inlet-diffuser 36, is specifically designed in a novel manner to include a built-in and relatively elongated, central and preferably cylindrically-shaped recess at 40 having a closed forward or upstream end at 40a and an open aft or downstream end at 40b. To this end, the said valve member 37, which incorporates a hollow, tapered, pointed aft end at 37a, may further preferably incorporate a hollow, relatively elongated forward end-valve member-body portion at 37b that precisely interfits in a slidable relation within the center body-central recess 40 and up against the closed end 40a thereof when the said valve member 37 is in its open position of FIG. 4, which, of course, occurs during the boost operation of the ramjet 27. The said valve member 37 is in the aforementioned open position to provide an adequate air flow area ahead (upstream) of the boost-combustion chamber 29. Thus, when in the said open position, the tapered, pointed aft end 37a of the valve member 37 is disposed in a substantial spaced relation forward of the upstream end of a novel, hollow combined valve seat means and cruise nozzle-throat-forming member, indicated generally at 41, so that a relatively large rearward-flowing volume of incoming air through the relatively enlarged, open-ended central passage 41a of the member 41 is assured. As inferred above, the combined member 41 serves as a two-fold purpose; namely, that of being, in effect, a valve seat for the valve member 37 and, in addition, forming a portion of the exhaust nozzle and throat for the cruise stage 32. The valve seat portion is formed by the previously-mentioned central passage 41a inherently constructed through the member 41, and the aforementioned portion of the exhaust nozzle and throat is formed between the outer periphery of the member 41 and the inside circumference of the cruise stage 32. To this end, the outer periphery of the member 41 is specifically configured, together with the said inside circumference of the cruise stage 32 to specifically form the previously-noted, cruise nozzle throat, at 34, which is clearly indicated as being of a significantly reduced size as compared with the size of the boost nozzle throat 31.

Upon the completion of the operation of the boost stage 28 to achieve the previously-noted Mach 4 speed, for example, and its subsequent ejection from the ramjet 27 of FIG. 4, the second flight regime, which is to vary between Mach 4 and 6, as noted in the previous example, is initiated by the start of combustion in the forward cruise stage 32, as noted hereinbefore. At this time, the novel cold flow-valve member would be adjusted to its valve closed position of FIG. 4a in sealed relation against the said valve seat 41a to thereby block any flow through the central passage formed within the combined member 41 and with the aft tapered, pointed end 37a thereof projecting rearwardly from the downstream end 41b of the member 41 into, and, thereby forming part of the cruise nozzle 35. In this unique manner, the valve member 37, when in the said closed valve position, becomes positively effective to ensure that the rearward flow is now ducted only through the now very small, annular combustor-nozzle, comprising the cruise-combustion chamber 33 and cruise-exhaust nozzle 35 during the cruise operation of the inventive ramjet 29. Thus, although the inventive form of FIG. 4 is naturally more complex, is of a longer configuration than that of the FIG. 3 arrangement and, even, perhaps, constitutes the heavier of the two engines; nevertheless, from a computational analysis thereof it has been determined that the FIG. 4 engine does offer an increased impulse of approximately 100 seconds higher performance.

Thus, a new and improved, two-stage ramjet is offered by the present invention, whereby two separate combustor-nozzle assemblies constituting a boost and cruise stage each tailor-made for a specific portion of the overall flight regime and mounted in tandem have been designed with the entire boost stage being made ejectable therefrom on completion of its portion of the overall flight to thus provide a simple technique for achieving the benefits of the conventional two-position ramjet-exhaust nozzle-throat without incurring the usual penalties of the mechanical complexity and reduced reliability customarily involved therewith.

I claim:

1. A two-stage ramjet comprising: an inlet-diffuser section; a forward cruise stage disposed immediately downstream of, or made integral with said inlet-diffuser section and having a cruise-combustion chamber and relatively small, cruise exhaust nozzle specifically optimized for producing cruise flight varying between predesigned relatively high supersonic and hypersonic flight speeds; and an aft boost stage tandem mounted to the rear of said forward cruise stage and including a boost-combustion chamber and relatively large, boost-exhaust nozzle expressly optimized for generating an accelerative thrust or boost from a previously attained, ground- or air-launched speed of from low-to-mid-supersonic, to the said predesigned relatively high supersonic speed at which firing of the said forward cruise stage occurs; said boost-combustion chamber having an inlet section arranged in an interfitted, air sealed relation with, and adapted to be initially quick-releasably mounted to the outlet portion of said cruise-nozzle to thereby provide a continuous flow path between said cruise and boost stages when said boost stage is being actuated to generate the boost phase of ramjet operation, and to be subsequently ejectable from said cruise stage when said boost phase of ramjet operation has been completed; said boost stage further including a first, relatively elongated plug member of a predetermined configuration and extending in a centrally-disposed relation along the longitudinal axis of said boost-combustion chamber to terminate in a first, aft, plug member-end portion at, and particularly assisting in the formation of the throat portion of the said relatively enlarged, boost-exhaust nozzle to that preselected to positively provide for the said optimization of the boost stage to ensure the boost phase of ramjet operation from the said speed of launch to the said predesigned relatively high supersonic speed; said cruise stage further including a combined center body and second, relatively elongated plug member terminating in a first, forward end portion incorporating a spike element extending through and further upstream of the inlet diffuser section, and a second, aft plug member-end portion at, and particularly assisting in the formation of the reduced-sized, throat portion of the second relatively small, cruise-exhaust nozzle to that preselected to specifically provide for the optimization of the cruise stage to ensure the cruise phase of ramjet operation from the said relatively high supersonic speed to the selected hypersonic speed; the aft end portion of said second, plug member incorporating a tapered, integral end section projecting in a further aft direction in an air-sealed relation into a recess formed in a second, forward end portion of said first, plug member to thereby ensure the said continuous flow path between said boost and cruise phases during the operation of said boost stage.

* * * * *